Patented Oct. 10, 1939

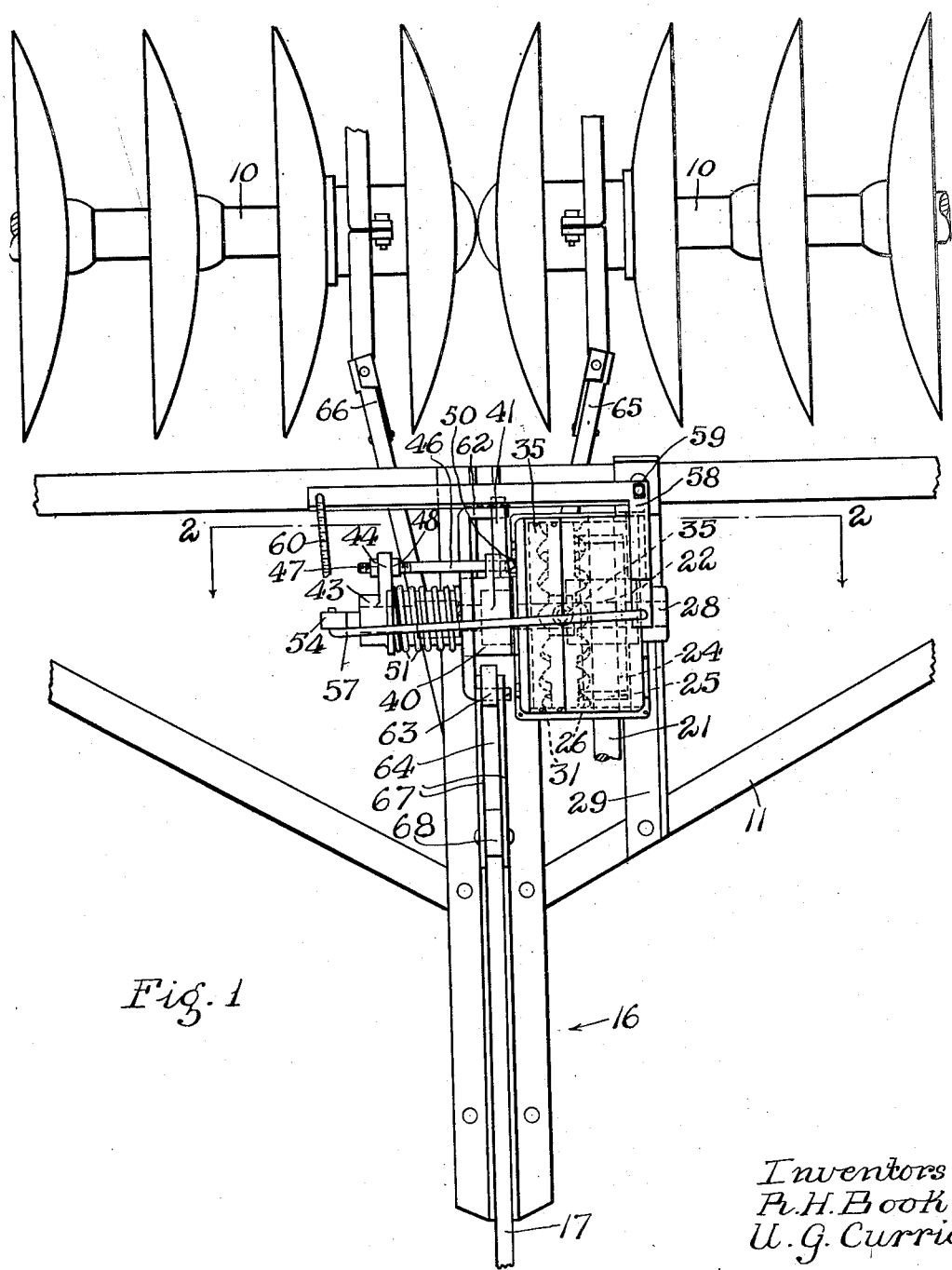

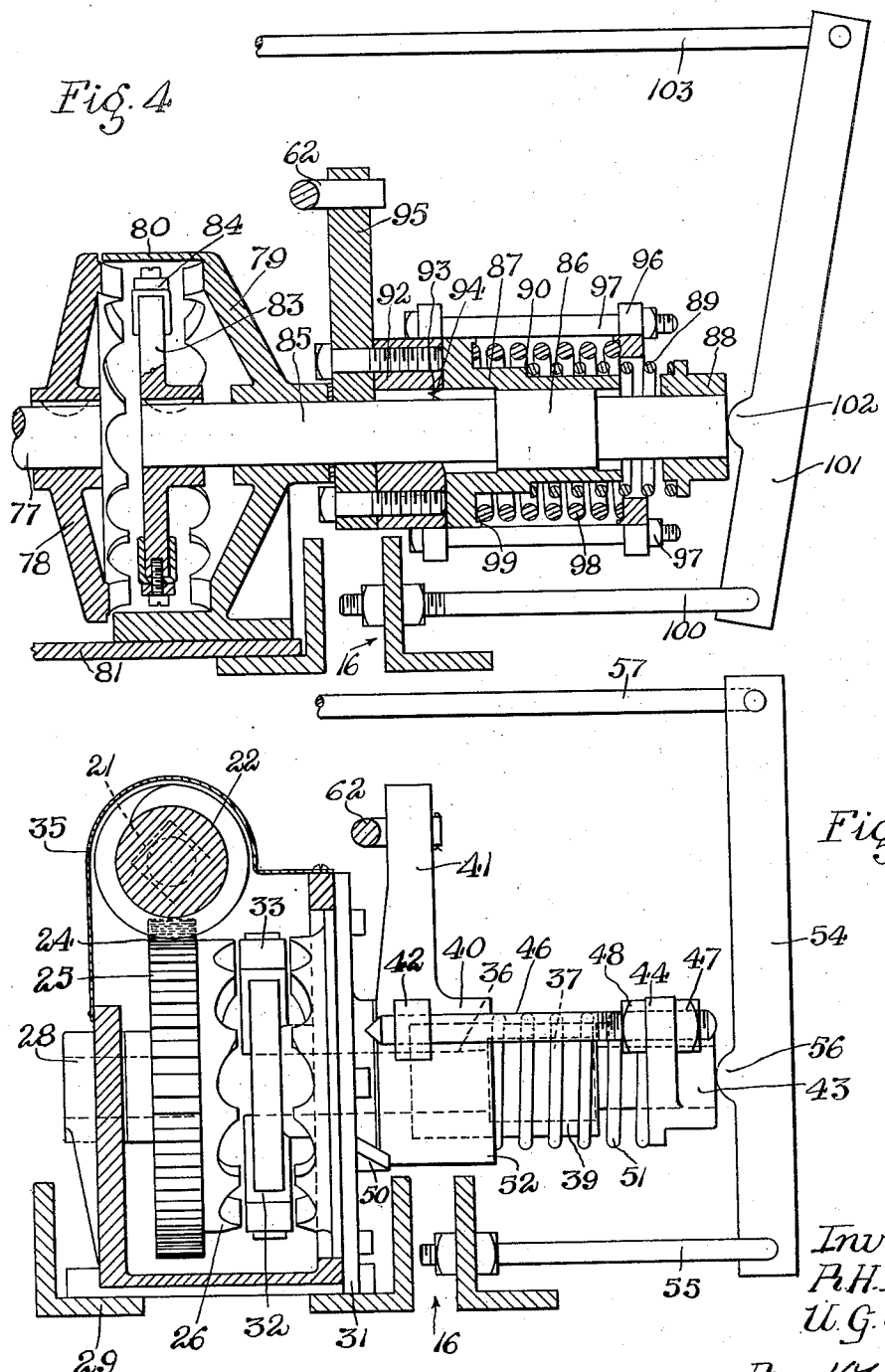

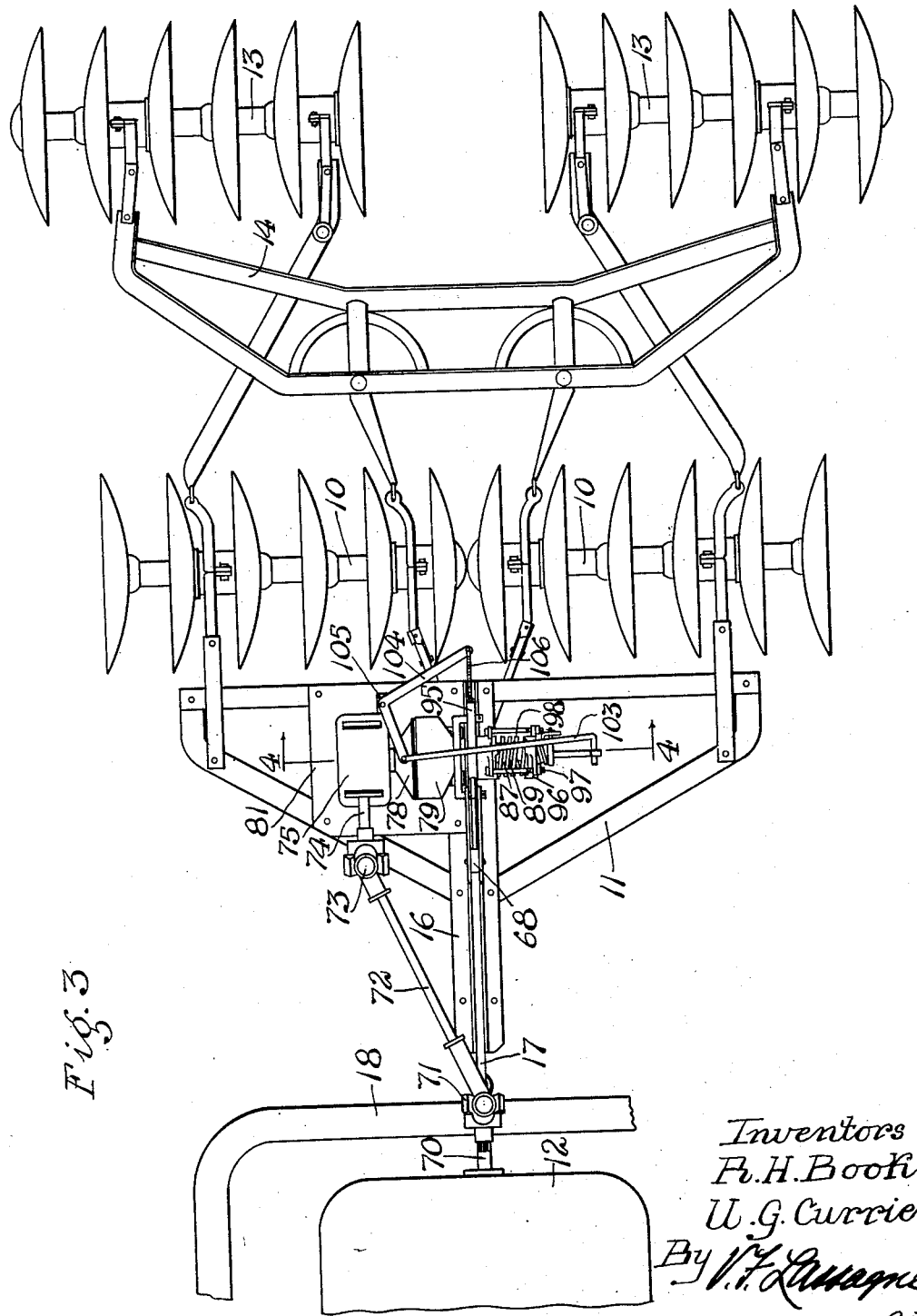

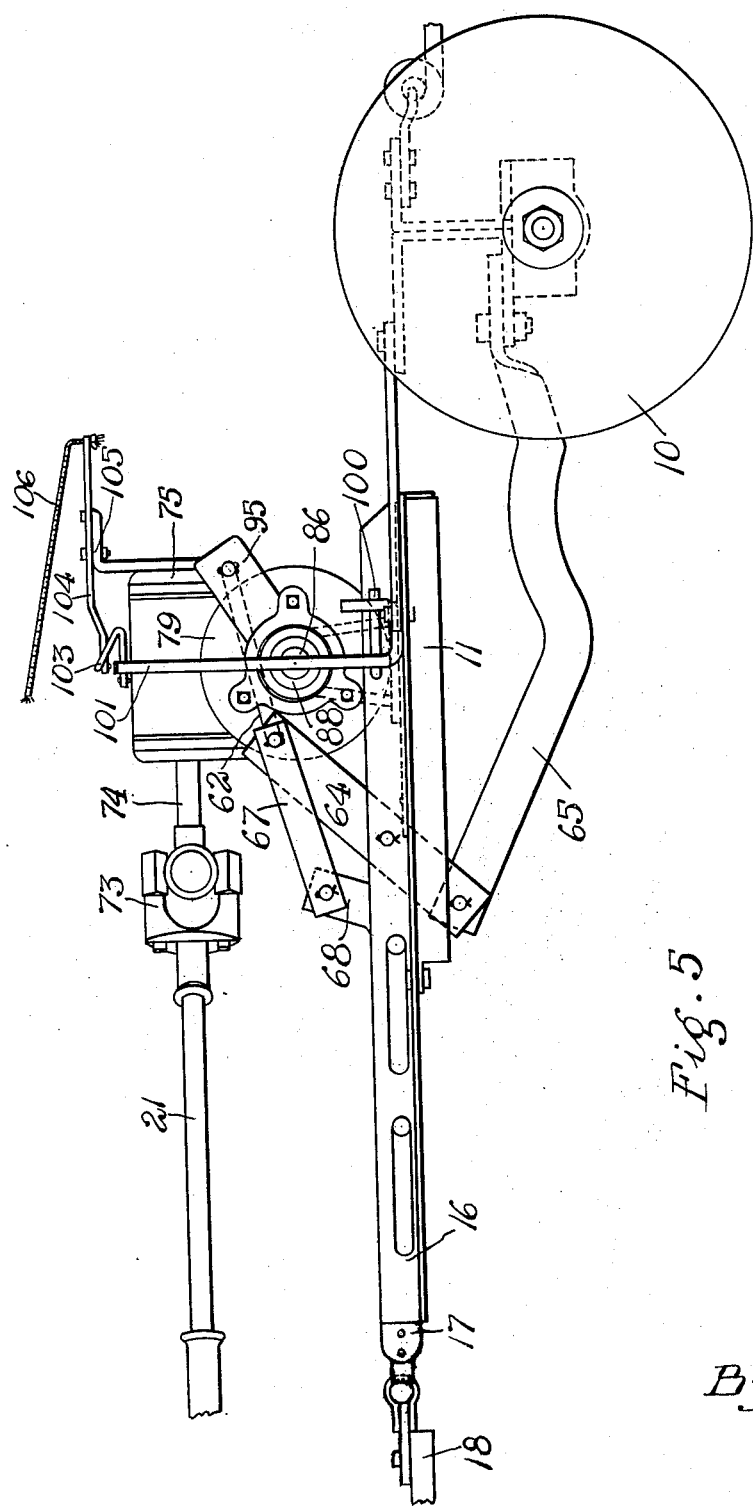

2,175,243

UNITED STATES PATENT OFFICE 2,175,243

HARROW CONSTRUCTION

Raymond H. Book and Ulysses Grant Currier, Rock Falls, Ill., assignors to International Harvester Company, a corporation of New Jersey Application September 30, 1938, Serial No. 232,638

20 Claims. (Cl. 55—83)

This invention relates to a harrow construction. More specifically it relates to a device for bringing the gangs of a harrow from angled working position to parallel transport position.

In harrow construction there is always the problem of bringing the gangs from working position to transport position. In some cases, this is done by backing the harrow and, in other cases, by pulling the harrow forwardly. Where the harrow is pulled by a tractor, it is desirable to employ the power of the tractor for varying the angle of the gang.

An object of the invention is to provide an improved harrow construction.

A further object is the provision of a device for varying the angle of the gangs of a harrow by means of power supplied by the tractor pulling the harrow.

Another object is to provide a device mounted on the front frame of a tandem disk harrow for removing the angle of the gang by connection with the power take-off shaft of the tractor pulling the harrow.

Other objects will appear from the disclosure.

The device embodying the present invention is mounted on the front frame of a tandem disk harrow. It is composed essentially of a fixed clutch member, a rotatable clutch member, spaced therefrom and driven by the power take-off shaft of the tractor pulling the harrow, and a shiftable clutch member between the other clutch members mounted on a shaft and occupying one of three positions: engagement with the fixed member for holding the gangs of the harrow in fixed angular position, engagement with the rotatable clutch member for bringing the gangs out of the angle position and out of engagement with both clutch members for allowing the gangs to go into angle position. The shiftable clutch member has a connection through the shaft in which it is mounted with the gangs of the harrow. In the preferred form of the invention, the device is operable in such a way that the shiftable clutch member is forced out of engagement with the rotatable clutch member when the gangs have been brought completely out of angle position. In the modified form, a predetermined pull upon the gangs, as in the case of the encountering of an obstruction, forces the shiftable clutch member out of engagement with the rotating clutch member.

In the drawings,—

Figure 1 is a plan view showing a part of a harrow and the preferred modification of a device for bringing the gangs of the harrow out of angle;

Figure 2 is a section taken along the line 2—2 of Figure 1;

Figure 3 is a plan view of a harrow with the modified form of a device for de-angling the harrow;

Figure 4 is a section taken along the line 4—4 of Figure 3; and,

Figure 5 is a side view of the modified device and a part of the harrow.

The invention is shown as applied to a tandem disk harrow of the type shown in the patent to Mowry et al. No. 1,725,409, dated August 20, 1929. As seen in Figure 3 of the present application, this harrow comprises essentially front gangs 10, a front frame 11 having attachment with the outer end of the front gangs and connected to a tractor 12, rear gangs 13, and rear frame 14. The inner ends of the rear gangs are connected with the outer ends of the front gangs, and the inner ends of the front gangs are connected with the outer ends of the rear gangs through the rear frame 14. The arrangement is such that a single control is employed for angling both front and rear gangs jointly. The front frame 11 is connected to the tractor 12 by means of a tongue 16 formed of a pair of spaced angle members and a slidable draft head 17 connected to the drawbar 18 of the tractor.

The preferred form of the invention is shown in Figures 1 and 2. A power take-off shaft 21 extends from the tractor back over the front frame 11 of the harrow and has at its very end a worm 22. This worm is in meshing engagement with a worm wheel section 24 of a member 25 having a clutching section 26. This member 25 is rotatably supported in a bracket member 28 carried on one of the angle members of the tongue 16 and an angle member 29 paralleling the tongue. In opposed, spaced parallel relation is a fixed clutch member 31 mounted on one of the angle members of the tongue. Positioned between the rotatable member 25 and the fixed clutch member 31 is a shiftable clutch member 32 having a pair of rollers 33 at opposite sides adapted to engage the clutching section 26 or the fixed clutch member 31. A cover member 35 is secured to the bracket member 28 to enclose the worm 22 and the rotatable, shiftable and fixed clutch members.

The clutch member 32 is fixed to the end of a shaft 36 slidably and rotatably supported on the fixed member 31. The shaft 36 has a portion 37 of square cross section. In engagement with this square portion 37 is a collar portion 39 of similar internal dimensions of a member 40 having an arm portion 41 extending outwardly in a radial direction from the shaft 36. There is also a lug 42 on the member 40. A collar 43 is secured on the end of the shaft 36 and carries a lug 44. A rod 46 passes through openings in the lugs 42 and 44 and is fixed to the collar 43 by means of nuts 47 and 48. The end of this rod extends into close proximity with the fixed clutch member 31, so as to strike a camming projection 50 on the member 31 when the rod occupies the proper angular position. A spring 51 extends between the collar 43 over the collar portion 39 into engagement with a shoulder 52 on the member 40. A lever 54 is pivotally mounted at one end on a rod 55 secured to the tongue 16. Intermediate the ends of the lever is a lug 56 adapted to engage the collar 43 on the end of the shaft 46. A link 57 extends between the other end of the lever 54 and a bell crank 58 pivoted on the front frame 11 of the harrow at 59. A cord 60 is also connected with the bell crank 58 and extends within easy reach of an operator's seat on the tractor 12.

A link 62 is connected to the end of the arm portion 41 of the member 40 and extends to a point of connection at 63 with the end of a lever 64. The lever 64 is pivoted intermediate its ends on the tongue 16 and extends below the tongue. At the end below the tongue, links 65 are connected and extend to connections with the inner ends of the front gangs 10. This may also be seen in Figure 5, which discloses a modification which is identical with the preferred form as to the parts just described. Links 67 connect the upper end of the lever 64 and an upstanding portion 68 of the slidable draft head 17.

The spring 51 between the member 40 and the collar 43 on the shaft 36 is under compression and tends to force the collar 43 to the right, as viewed in Figure 2, so that the shaft 36 is also forced to the right and the shiftable clutch member 32 is in engagement with the clutch member 31. Thus, the harrow gangs will be held in any particular angle where they happen to be, since the clutch member 32, shaft member 36, and the arm portion 41 of the member 40 cannot rotate.

Let us assume now that the gangs of the harrow are in angled position and it is desired to bring them out of this position to a transport position. Then, the operator of the tractor pulls the cord 60, and this is effective, through the bell crank 58, link 57, and lever 54, to cause the lug 56 of the lever 54 to push the shaft 36 in a direction to the left, as viewed in Figure 2. When the shaft 36 is pushed as far as possible to the left, the clutching member 33 is in engagement with the clutching section 26 of the member 25, which rotates continuously because of connection with the power take-off shaft of the tractor through the worm wheel section 24 and the worm 22. With the clutch member 32 in engagement with the clutching member 26, the member 32 rotates and causes the shaft 36 and crank arm portion 41 also to rotate, the latter moving in a direction forwardly, as viewed in Figure 2. This will cause the gangs to move out of angle to the transport position, by virtue of connection of the portion 41 with the gangs through links 62, 65 and 66, and lever 64. In order that there may be no injury to the device or to the gangs by movement of the gangs beyond the transport position, the camming projection 50 on the fixed clutch member 31 has been provided. This projection is in such a position that, when the gangs have reached transport position, the end of the rod 46 will ride up upon the camming projection and be moved axially to the right, as viewed in Figure 2, so as to move the shaft 36 to the right and to move the clutch member 32 out of engagement with the clutch member 36.

When the gangs are in transport position, and it is desired to angle them, the operator of the tractor pulls upon the cord 60 sufficiently to force, through the medium of the lever 54, the clutch member 32 to an intermediate position out of engagement with both the fixed clutch member 31 and the clutching section 26 of the rotatable member 25, as actually shown in Figure 2. Then, the tractor is run forwardly and the gangs move to an angled position, which may be determined by any suitable stop member placed in the path of the crank arm portion 41 of the member 40, so as to limit its movement.

The modified forms of Figures 3, 4 and 5 are quite similar to the preferred form. As shown in Figure 3, there is a power take-off shaft 70 connecting through a universal joint 71, with a telescoping shaft 72, in turn connecting, through universal joint 73, with a shaft 74 extending into a gear reduction box 75. A stub shaft 77 extends out of the gear reduction box and has fixed thereto a clutch member 78. In opposed, spaced parallel relation is a fixed clutch member 79 having a casing portion 80 substantially enclosing the space between the fixed and rotatable clutch members. The fixed member 79 is mounted on a plate 81 supported by the front frame 11 of the harrow, which plate also supports the gear box 75. Positioned between the fixed and rotatable clutch member is a shiftable clutch member 83 having rollers 84 at opposite sides adapted to engage the clutch members 78 and 79. The clutch member 83 is fixed on the end of a shaft 85 journaled in the fixed clutch member 79. This shaft has a square section 86, over which is sleeved a sleeve member 87 having the proper internal dimensions to engage the square section 86. A collar 88 is fixed to the end of the shaft 86 and a spring 89 extends between this collar and a shoulder 90 on the sleeve 87. A collar 92 abuts the sleeve 87 and has a clutch section 93 in engagement with a clutching section 94 of the sleeve 87. An arm member 95 is bolted to the collar 92. A plate member 96 is fixed in spaced relation to the collar 92 by bolts 97 and a spring 98 extends between the collar 97 and a shoulder 99 on the sleeve 87. A rod 100 is bolted to the tongue 16 and has pivoted thereto a lever 101 having a lug portion 102 in engagement with the end of the shaft 86. At the outer end of the lever 101, a link 103 is connected. This link is also connected to a bell crank 104 pivoted at 105 where a rope 106 is connected, which extends within reach of the operator's seat on the tractor.

A link 62, as described in connection with the modification of Figures 1 and 2, is connected to the outer end of the arm member 95 as well as to the upper end of lever 64. The lower end of this lever is connected to the inner ends of the front gangs by means of links 65 and 66. A pair of links 67 connects the upper end of lever 64 with the upstanding portion 68 of the draft head 17.

The operation of the modified form is very similar to the operation of the preferred form.

Pull on the rope 106 is effective to make the lever 101 move the shaft 85 to the left, as viewed in Figure 4, and thus bring the clutch member 83 into engagement with the rotatable clutch member 78. This causes an angular movement of the clutch member 83 and a corresponding movement of the arm member 95 through its connection with the member 83 by the shaft 85, sleeve 87, and collar 92. The arm member 95 is connected to the inner ends of the front gangs, and angular movement of it is effective to bring the gangs from angle position to transport position. When the gangs are moved to transport position, they will resist any further tendency to move them, and, in order that injury to them may be avoided, the collar 92 and the sleeve 87 have been provided with clutching sections 93 and 94. Thus, when the transport position is reached, the springs 89 and 99 being properly adjusted, the sleeve 87 will move to the right, as viewed in Figure 4, out of engagement with the collar 92. Through the action of the spring 89 on the collar 88, the shaft 85 is also moved to the right, and with it the clutch member 83, out of engagement with the rotatable clutch member 78. The same thing will take place when the harrow gangs strike an obstruction. Too great a force exerted by the gangs in striking an obstruction upon the crank member 95 will cause the sleeve 87 to move axially out of engagement with the collar 92. Normally, the clutch member 83 is in engagement with the fixed clutch member 79 and the gangs remain in a fixed angle position. When it is desired to move them from transport to angle position, the operator of the tractor pulls on the rope 106 sufficiently to move the clutch member 83 to an intermediate position out of engagement with both the fixed clutch member 79 and the rotatable clutch member 78. Then, the tractor is moved forwardly, and the gangs move to angle position.

It will be apparent from the foregoing description that a new and novel device has been provided for moving the gangs of a harrow from angled working position to a straight transport position. This device is operated by means of power from the tractor and is simple and compact and easily carried by the front frame of the harrow. In the one modification, the device is so constructed that operation of the device automatically ceases upon the reaching of a predetermined angle position of the gangs. In the other modifications, operation of the device ceases upon a predetermined pull upon the gangs.

The intention is to limit the invention only within the terms of the appended claims.

What is claimed is:

1. A de-angler operable by means of the power of a tractor for a disk harrow pulled by the tractor, comprising a rotatable member mounted on the harrow connected to the power take-off shaft and having clutching elements on one face, a fixed member connected to the harrow in parallel spaced relation to the rotatable member and having clutching elements on a face toward the clutching elements of the rotatable member and a projection on the opposite face, a shaft rotatably and slidably mounted in the plate member, a clutch plate fixed to one end of the shaft and positioned between the rotatable member and the fixed member, a collar fastened to the other end of the shaft and carrying a rod extending to a point adjacent the plate member spaced from the shaft an amount equal to the spacing of the projection on the fixed member from the shaft, an angling lever slidably keyed on the shaft at the face of the plate member opposite the clutch plate and slidably supporting the end of the rod, and a spring surrounding the shaft and abutting a stop and the angling lever.

2. A de-angler operable by means of the power take-off shaft of a tractor for a disk harrow drawn by the tractor, a rotatable member connected with the power take-off shaft and having clutching elements, a fixed member spaced from the rotatable member and also having clutching elements on one side and a camming element on the other side, a shaft rotatably and slidably mounted in the fixed member, a clutching plate fastened to one end of the shaft and positioned between the rotatable and fixed members so as to engage either one or the other, an angling lever connected to the gangs and slidably keyed to the shaft on the same side of the fixed member as the camming element, a spring abutting the angling lever and fastened to the end of the shaft opposite to that supporting the clutching plate and urging the shaft so as to bring the clutching plate into engagement with the fixed member, and a rod fastened to the same end of the shaft as the spring and extending to a point adjacent the fixed member at a distance from the shaft equal to the spacing of the camming member.

3. A harrow de-angler operable by the power of a tractor, comprising a rotatable clutching member connected to the power take-off shaft, a fixed clutching member positioned in spaced relation thereto, a rotatable clutching plate positioned between the clutching members and engageable with either of them, an angling lever connected with the harrow gangs and arranged to rotate with the clutching plate, and means for causing the clutching plate to move out of engagement with the rotatable clutching member after a predetermined angular movement of the angling lever.

4. A harrow de-angler operable by a power take-off shaft of a tractor drawing the harrow, comprising a rotatable clutch member connected with the power take-off shaft, a fixed clutch member spaced from the rotatable clutch member, a clutch plate positioned therebetween, a shaft supporting the clutch plate at one end and being adjustable to place the clutch plate in engagement with the rotatable clutch member or with the fixed clutch member, an angling lever mounted on the shaft and connected with the harrow gangs for angling the same, and means for moving the shaft and disengaging the clutch plate from the rotatable clutch member upon a predetermined angular movement of the angling lever.

5. A harrow de-angler operable by the power of a tractor drawing the harrow, comprising a rotatable clutch member connected with the power take-off shaft, a fixed clutch member spaced therefrom, a clutch plate interposed between the clutch members, a shaft supporting the clutch plate and adjustable axially to cause the plate to engage the rotatable clutch member or the fixed clutch member, an angling lever connected to the harrow gangs for angling the same and to the shaft, and means for causing axial movement of the shaft and consequent disengagement of the clutch plate from the rotatable clutch member upon a predetermined angular movement of the harrow gangs.

6. A harrow de-angler operable by a power take-off shaft of a tractor drawing the harrow, comprising a rotatable clutch member connected to the power take-off shaft, a fixed clutch member spaced from the rotatable clutch member and carrying a camming projection, a clutch plate interposed between the clutch members, a shaft supporting the clutch plate and being axially shiftable to allow the clutch plate to engage either the rotatable clutch member or the fixed clutch member, an angling lever connected with the harrow gangs and mounted on the shaft to rotate therewith adjacent the fixed clutch member, and means connected to the shaft and supported by the angling lever to engage the camming projection upon a predetermined angular movement of the harrow gangs and effect an axial movement of the shaft and consequent disengagement of the clutch plate from the rotatable clutch member.

7. A harrow de-angler operable by the power of a tractor drawing the harrow, comprising a rotatable clutch member connected to the power take-off shaft, a fixed clutch member spaced from the rotatable clutch member, a clutch plate interposed between the clutch members and engageable with either of them, a shaft extending through the fixed clutch member and supporting the clutch member and being yieldingly urged in an axial direction to keep the clutch plate in contact with the fixed clutch member, a control member engageable with the shaft for axially shifting the same to bring the clutch plate into engagement with either the rotatable clutch member or the fixed clutch member or into an intermediate position out of engagement with either of the clutch members, and an angling lever mounted for rotation with the shaft and connected to the harrow gangs.

8. The de-angler as specified in claim 7, and further including means for effecting a positive axial shifting of the shaft and consequent disengagement of the clutch plate from the rotatable clutch member upon a predetermined angular movement of the angling lever.

9. The de-angler as specified in claim 7, and further including means for effecting a positive axial shifting of the shaft and consequent disengagement of the clutch plate from the rotatable clutch member upon a predetermined pull upon the angling lever.

10. A harrow de-angler comprising a rotatable clutch member operable by the power of a tractor, a fixed clutch member spaced from the rotatable clutch member and carrying a camming projection, a clutch interposed between the clutch members, an axially adjustable shaft extending through the fixed clutch member and supporting the clutch plate and being yieldingly urged in an axial direction so as to hold the clutch plate in engagement with the fixed clutch member, a control lever for shifting the shaft axially to bring the clutch plate out of engagement with the fixed clutch member into engagement with the rotatable clutch member or into an intermediate position out of engagement with either of the clutch members, an angling lever mounted for rotation with the shaft and connected with the harrow gangs, and a rod connected to the shaft and guided by the angling lever whereby upon a predetermined rotation of the angling lever the rod engages the camming projection on the fixed clutch member and an axial shifting of the shaft with consequent disengagement of the clutch plate from the rotatable clutch member is effected.

11. A harrow de-angler operable by a power take-off shaft of a tractor drawing the harrow, comprising a rotatable clutch member, a fixed housing member immediately adjacent the rotatable clutch member and carrying clutching elements, a clutch plate enclosed within the clutch member and the housing member, a shaft extending through the housing member and supporting the clutch plate and being yieldingly urged in an axial direction to hold the clutch plate in engagement with the clutching elements of the housing member, a control member for axially shifting the shaft and moving the clutch plate either into engagement with the rotatable clutch member or into an intermediate position out of engagement with either the clutch member or the housing, an angling lever mounted for rotation with the shaft and connected to the harrow gangs, means connecting the shaft and the angling lever for axially shifting the shaft to move the clutch plate out of engagement with the rotatable clutch member upon a predetermined pull of the gangs on the angling lever.

12. A harrow de-angler operable by the power of a tractor pulling the harrow, comprising a rotatable clutch member, a fixed clutch member, a shaft extending through the fixed clutch member, a clutch plate fixed to one end of the shaft and interposed between the clutch members, an angling lever mounted on the shaft and having a clutching section, a clutching sleeve fixed to the shaft and releasably engaging the clutching section of the angling lever, whereby upon a predetermined pull of the harrow gangs upon the angling lever the clutching sleeve and shaft are shifted axially and pull the clutching plate out of engagement with the rotatable clutch member.

13. A harrow de-angler operable by the power of a tractor drawing the harrow comprising a fixed member, a movable member spaced therefrom and driven by the power take-off shaft, a shiftable member between the fixed and movable members adapted to engage the fixed member for holding the angle of the gangs, to engage the movable member for de-angling the gangs, or to occupy an intermediate position out of engagement with both fixed and movable members for allowing the gangs to be moved to angled position, and means connecting the gangs and the shiftable member.

14. A harrow de-angler as specified in claim 13, and further including means for effecting disengagement of the shiftable member and movable member upon a predetermined angular position of the gangs.

15. A harrow de-angler as specified in claim 13, and further including means for effecting disengagement of the shiftable member and movable member upon a predetermined pull upon the gangs.

16. A disk harrow adapted to be propelled by a tractor having a power take-off, said harrow comprising a frame and disk gangs, disk angling means for the gangs, power means on the frame including a continuously rotating clutch part driven from the power take-off and another clutch part connected to the gangs and adapted to be engaged by the first clutch part, and operator controlled means for engaging the clutch parts to cause angling of the disk gangs.

17. A disk harrow adapted to be propelled by a tractor having a power take-off, said harrow comprising a frame and disk gangs, disk angling means for the gangs, power means on the frame including a continuously rotating clutch part driven from the power take-off and another clutch part connected to the gangs and adapted to be engaged by the first clutch part, releasable yielding means for holding the clutch parts normally disengaged and for locking the gangs in an angled position, and operator controlled means for engaging the clutch parts to change the angle of the disk gangs.

18. A disk harrow adapted to be propelled by a tractor having a power take-off, said harrow comprising a frame and disk gangs, disk angling means for the gangs, manually controllable clutch means on the frame driven from the power take-off, means to angle the disk gangs from said means, and connections between the power take-off and clutch means to drive the latter including worm reduction gearing.

19. A disk harrow adapted to be propelled by a tractor having a power take-off, said harrow comprising disk gangs connected to the frame for angling movement, means on the frame driven from the power take-off including connections for positively angling the disk gangs, manually controlled means to make said means ineffective, and means controlled by draft forces to de-angle the gangs.

20. A disk harrow adapted to be propelled by a tractor having a power take-off, said harrow comprising disk gangs connected to the frame for angling movement, means on the frame driven from the power take-off including connections for positively moving the disk gangs in one di-direction, and draft controlled means for moving the disk gangs in another direction.

RAYMOND H. BOOK.
ULYSSES GRANT CURRIER.